(12) United States Patent
Arimatsu

(10) Patent No.: US 8,640,853 B2
(45) Date of Patent: Feb. 4, 2014

(54) ARTICLE ALIGNMENT DEVICE

(71) Applicant: Ishida Co., Ltd., Kyoto (JP)

(72) Inventor: Tatsuya Arimatsu, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 13/624,130

(22) Filed: Sep. 21, 2012

(65) Prior Publication Data

US 2013/0134015 A1     May 30, 2013

Related U.S. Application Data

(60) Provisional application No. 61/563,599, filed on Nov. 24, 2011.

(51) Int. Cl.
*B65G 47/24*     (2006.01)
*B65G 43/08*     (2006.01)

(52) U.S. Cl.
USPC .......................................... 198/406; 198/401

(58) Field of Classification Search
USPC .................... 198/401, 406, 407, 409
See application file for complete search history.

(56) References Cited

U.S. PATENT DOCUMENTS

| | | | | |
|---|---|---|---|---|
| 3,229,326 A | * | 1/1966 | Bergh | 198/399 |
| 3,967,724 A | * | 7/1976 | Allen et al. | 198/395 |
| 4,318,678 A | * | 3/1982 | Hayashi et al. | 198/399 |
| 4,703,679 A | * | 11/1987 | Hayashi et al. | 198/400 |
| 5,103,767 A | * | 4/1992 | Haugland et al. | 119/215 |
| 5,291,983 A | * | 3/1994 | Pegoraro et al. | 198/401 |
| 6,536,599 B1 | * | 3/2003 | Nielsen | 209/540 |
| 8,292,061 B2 | * | 10/2012 | Iwasa et al. | 198/407 |

FOREIGN PATENT DOCUMENTS

| | | |
|---|---|---|
| EP | 2279948 A1 | 2/2011 |
| JP | S61-83504 U | 6/1986 |
| JP | 2005-075445 A | 3/2005 |
| JP | 2010-155648 A | 7/2010 |

OTHER PUBLICATIONS

Extended European Search Report of the corresponding European Patent Application No. 12193935.9, dated Mar. 7, 2013.

* cited by examiner

*Primary Examiner* — James R Bidwell
(74) *Attorney, Agent, or Firm* — Global IP Counselors, LLP

(57) ABSTRACT

An article alignment device aligns articles having first end portions and second end portions that have a shape different from the shape of the first end portions. The article alignment device includes a first conveyance device, a second conveyance device, and a control device. The first conveyance device has conveyance units that carry and convey the articles. The first conveyance device conveys the articles in a first orientation. In the first orientation the first end portions are positioned on a downstream side with respect to a first conveyance direction of the articles. The second conveyance device is placed downstream of the first conveyance device. The control device controls the first and second conveyance devices such that the orientation of first articles conveyed by the second conveyance device are changed to a second orientation where the second end portions are positioned on the downstream side.

7 Claims, 8 Drawing Sheets

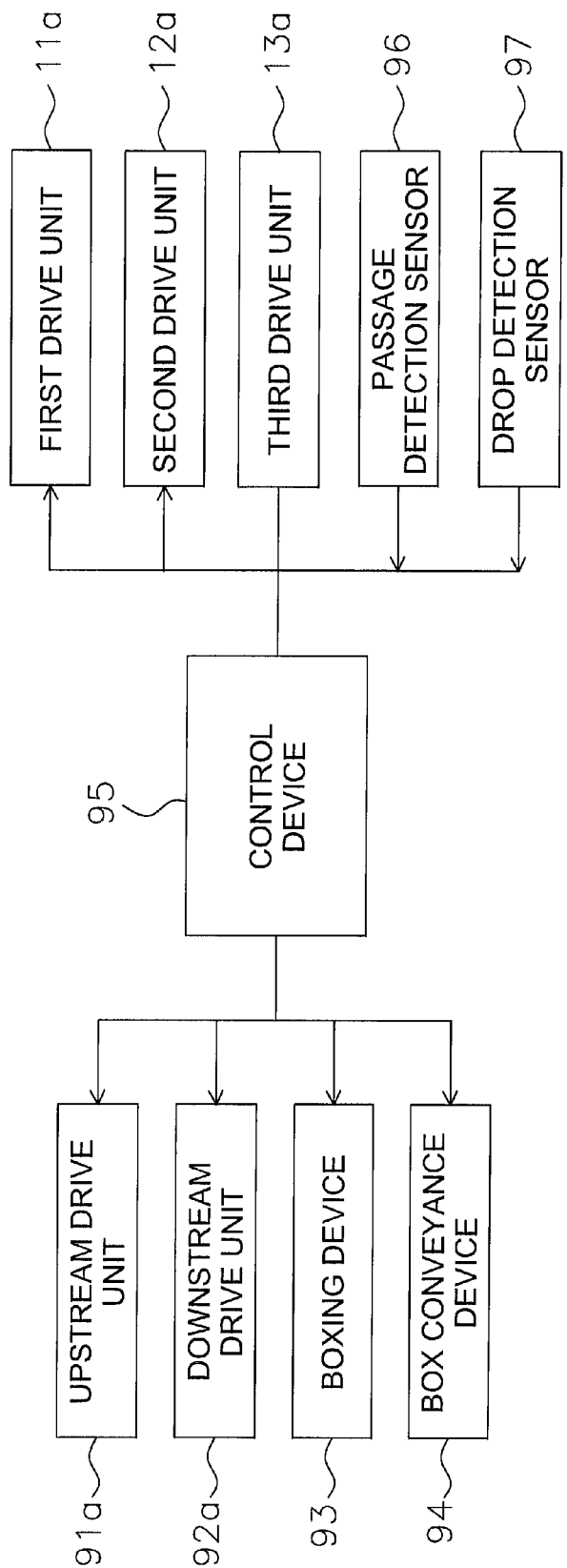
F I G. 4

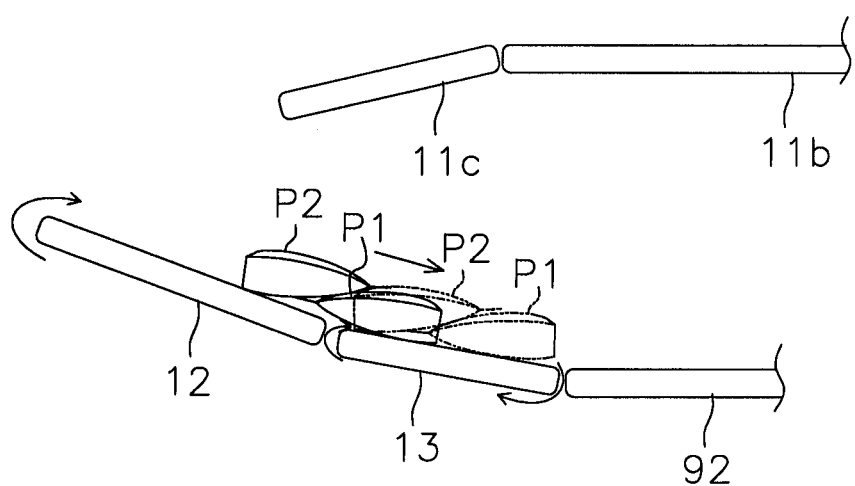
F I G. 7 D

ARTICLE ALIGNMENT DEVICE

CROSS-REFERENCE TO RELATED APPLICATIONS

This application claims priority to U.S. Provisional Application No. 61/563,599, filed on Nov. 24, 2011. The entire disclosure of U.S. Provisional Application No. 61/563,599 is hereby incorporated herein by reference.

BACKGROUND

1. Technical Field

The present invention relates to an article alignment device.

2. Related Art

Conventionally, boxing systems for efficiently boxing articles have been proposed. For example, the boxing system disclosed in Japanese Patent Application Laid-Open (JP-A) No. 2010-155648 includes an article alignment device that presses plates from both sides against plural articles that have been conveyed to a predetermined location and accumulated to thereby cause the plural articles to stand. The article alignment device aligns and boxes the articles by causing the articles to stand. Because of this, it becomes possible to effectively utilize the space inside the box, and a large number of the articles can be boxed in one box.

SUMMARY OF THE INVENTION

Among articles that are boxed, there are articles where the shape of the upper ends (first end portions) and the shape of the lower ends (second end portions) differ from each other. For example, an article such as a standing pouch has a bottom on its lower end in order to allow the bag to stand on its own. That is, the thickness of the lower end of the bag is larger compared to the thickness of the upper end of the bag. Even in a case where the device proposed in JP-A No. 2010-155648 is used to box articles where the shape of the upper ends and the shape of the lower ends differ from each other in this way, it is difficult to efficiently utilize one box.

It is an object of the present invention to provide an article alignment device that makes it possible to efficiently box articles having end portions with different shapes.

An article alignment device pertaining to the present invention aligns articles having first end portions and second end portions. The article alignment device is equipped with a first conveyance device, a second conveyance device, and a control device. The second end portions have a shape different from the shape of the first end portions. The first conveyance device has a conveyance unit that carries and conveys the articles a first conveyance direction. The first conveyance device conveys the articles in a first orientation where the first end portions are positioned on a downstream side with respect to the first conveyance direction. The second conveyance device is placed downstream of the first conveyance device and conveys the articles that have been conveyed thereto by the first conveyance device. The control device configured to control the first and second conveyance devices such that a selected first article is switched from the first orientation to a second orientation where the second end portion is positioned on the downstream side with respect to the first conveyance direction, and a second article is maintained in the first orientation.

It is preferred that the control device is configured such that the first and second conveyance devices position the second end portion of the first article and the second end portion of the second article neighboring each other. Because of this, a large number of the articles can be effectively aligned.

It is also preferred that the thickness of the second end portions be smaller than the thickness of the first end portions. Because of this, the sections of the bags where the thickness is small and the sections of the bags where the thickness is large overlap each other, so the amount of space needed at the time of packing can be reduced.

It is also preferred that the article alignment device pertaining to the present invention be further equipped with a first drive unit, a second drive unit, and a determination unit. The first drive unit drives the first conveyance device. The second drive unit drives the second conveyance device. The determination unit determines that the articles conveyed by the first conveyance device have reached a predetermined position. It is also preferred that the control device execute first processing by continuously driving the first drive unit and driving the second drive unit on the basis of the result of the determination by the determination unit. Because of this, the planar orientation of the continuously conveyed articles can be appropriately changed.

It is also preferred that second processing be processing that generates a drive command that drives the second drive unit before the articles reach the second conveyance device and that the first processing be processing that generates the drive command after it has been determined by the determination unit that the articles have reached the second conveyance device. Because of this, the second end portion of the first article and the second end portion of the second article can be reliably caused to neighbor each other.

The article alignment device pertaining to the present invention makes it possible to efficiently box articles having end portions with different shapes.

BRIEF DESCRIPTION OF THE DRAWINGS

FIG. 4 is a control block diagram.

FIG. 7D is a diagram showing the control of the article alignment device and conveyance of the bags during execution of the first processing.

DETAILED DESCRIPTION OF THE INVENTION

An embodiment of the present invention will be described below with reference to the drawings. The embodiment below is a specific example of the present invention and is not intended to limit the technical scope of the present invention.

(1) Overall Configuration

Figure 1:
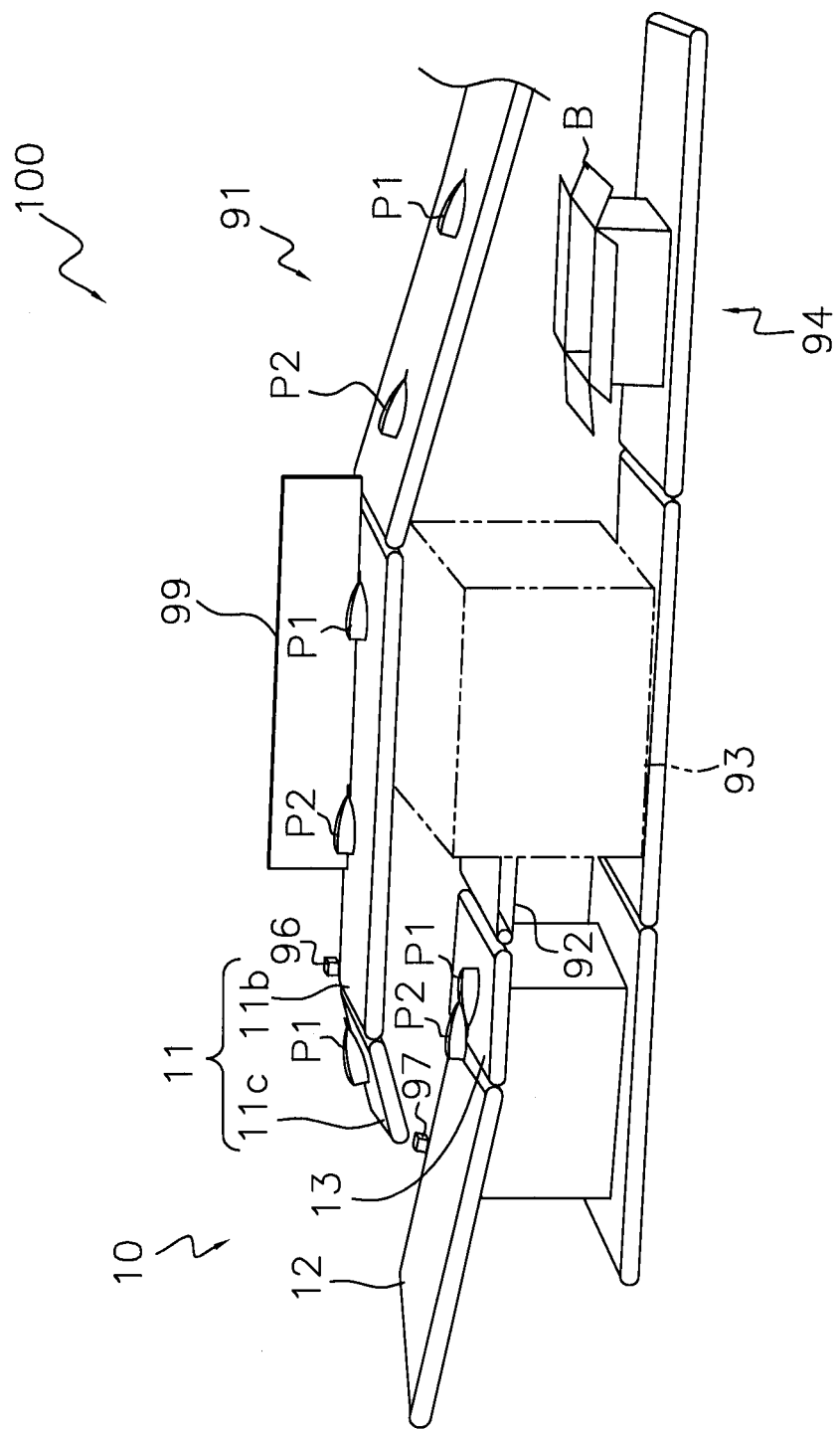
FIG. 1 is a schematic diagram of a boxing system that utilizes an article alignment device pertaining to the present invention.
Figure 2:
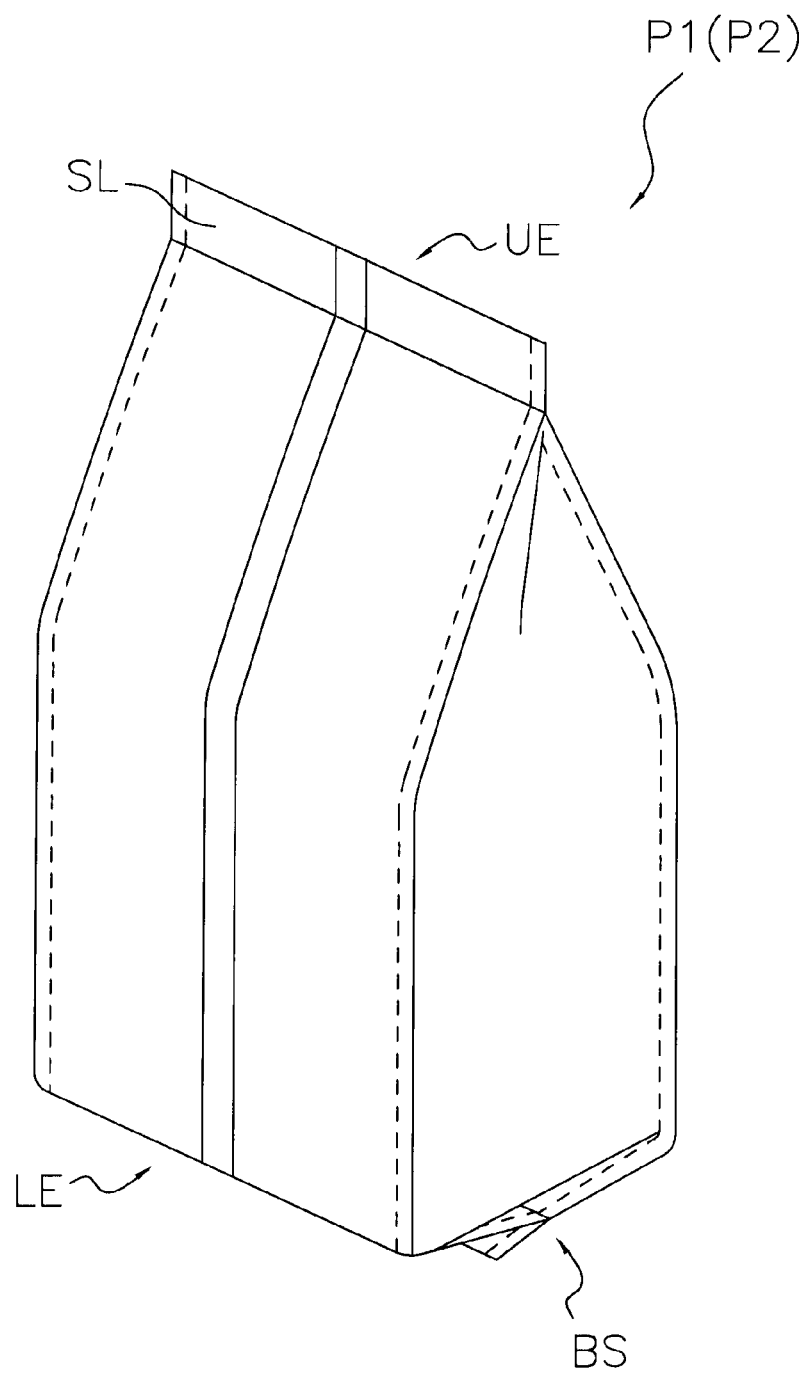
FIG. 2 is a diagram showing an example of a bag that is boxed by the boxing system.
Figure 3:
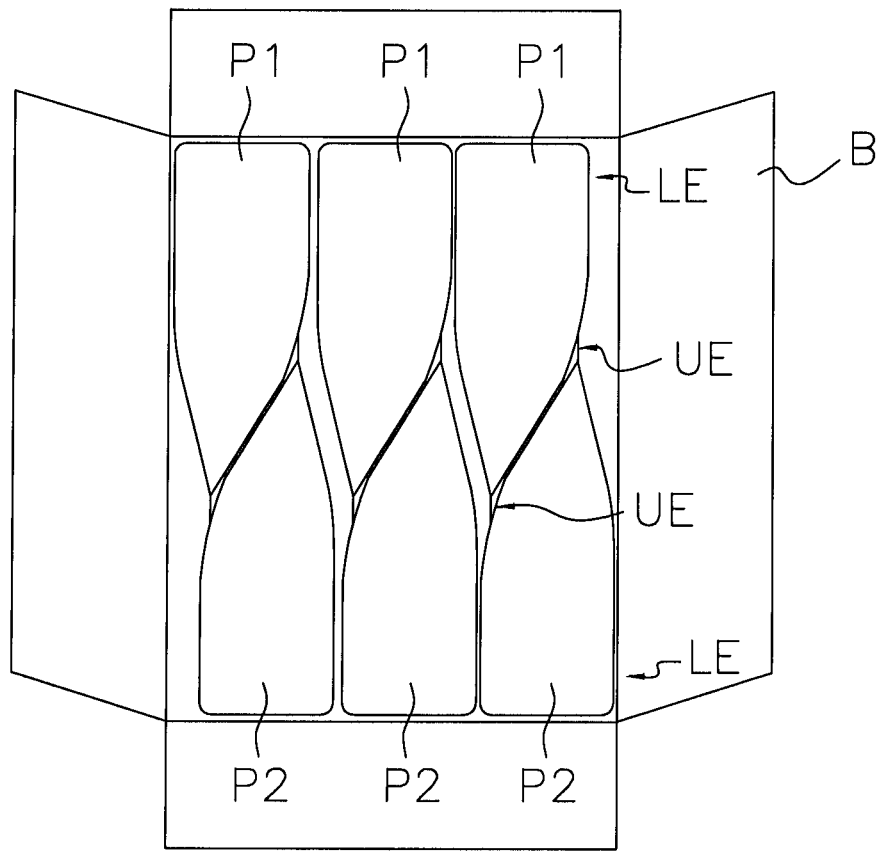
FIG. 3 is a diagram showing bags that have been boxed.

FIG. 1 is a perspective view of a boxing system 100 that utilizes an article alignment device 10 pertaining to the present invention. The boxing system 100 is a system for packing bags (articles) P1 (P2) shown in FIG. 2 in a box B shown in FIG. 3. The bags P1 and P2 are capable of standing on their own. Specifically, the bags P1 and P2 have a bottom portion BS on a lower end portion (a first end portion) LE. An upper end portion (a second end portion) UE of the bags P1 and P2 has a seal portion SL. That is, the shape of the upper end portion UE and the shape of the lower end portion LE of the bags P1 and P2 differ from each other. Further, the thickness of the lower end portion LE (the bottom portion BS) is larger compared to the thickness of the upper end portion UE (the seal portion SL). The boxing system 100 is a system for efficiently packing, in the box B, bags where the shapes of the upper end portion UE and the lower end portion LE differ from each other like the bags P1 and P2. The bags P1 and P2 both have the same configuration. Description will be given below in such a way that, among all the continuously conveyed bags P1 and P2, the bags conveyed in odd numbers will be identified as bags P1 and the bags conveyed in even numbers will be identified as bags P2.

As shown in FIG. 1, the boxing system 100 mainly includes an upstream conveyor 91, the article alignment device 10, a downstream conveyor 92, a boxing device 93, and a box conveyance device 94. The boxing system 100 is also equipped with a control device 95 for controlling each of the conveyors and devices (see FIG. 4). Each of the conveyors and devices included in the boxing system 100 is controlled by the control device 95. In the boxing system 100, the bags P1 and P2 are conveyed by the upstream conveyor 91 to the article alignment device 10. The article alignment device 10 changes the planar orientation of the bags P1 and P2 and thereafter conveys the bags P1 and P2 to the downstream conveyor 92. The downstream conveyor 92 thereafter conveys the bags P1 and P2 to the boxing device 93. The boxing device 93 packs the bags P1 and P2 in the box B. Thereafter, the box B is conveyed downstream by the box conveyance device 94.

(2) Upstream Conveyor

As shown in FIG. 1, the upstream conveyor 91 is placed on a most upstream side among the configurations included in the boxing system 100. The upstream conveyor 91 receives the bags P1 and P2, which have been made by a bag making and packaging machine not shown in the drawings, and conveys the bags P1 and P2 to the article alignment device 10.

The upstream conveyor 91 has an endless belt conveyor that conveys in a first conveyance direction. The first conveyance direction is from right to left in FIG. 1. Concavo-convexities are formed in the conveyance surface of the upstream conveyor 91. The conveyance surface has frictional force with respect to the bags P1 and P2. In FIG. 1, the upstream conveyor 91 is inclined with respect to the horizontal direction. Specifically, the end on the downstream side of the upstream conveyor 91 is positioned higher than the end on the upstream side with respect to a conveyance direction of the bags P1 and P2.

The upstream conveyor 91 conveys the bags P1 and P2 in a first planar orientation. The first planar orientation is an orientation where the lower ends LE of the bags P1 and P2 are positioned on a downstream side (the left side in FIG. 1) and the upper ends UE of the bags P1 and P2 are positioned on an upstream side (the right side in FIG. 1) with respect to the first conveyance direction of the bags P1 and P2. In other words, the bags P1 and P2 are conveyed on the upstream conveyor 91 in an orientation where the lower ends LE face the downstream side.

The upper conveyor 91 is driven by an upstream drive unit 91a (see FIG. 4). The upstream drive unit 91a continuously drives the upstream conveyor 91 at a constant speed according to a set speed. The upstream drive unit 91a is controlled by the control device 95.

(3) Article Alignment Device

The article alignment device 10 is a device for aligning the bags (articles) P1 and P2 in an orientation suited for boxing. Specifically, the article alignment device 10 conveys the bags P1 and P2 while appropriately changing the planar orientation of the bags P1 and P2 that have been conveyed thereto by the upstream conveyor 91. The article alignment device 10 conveys the bags P1 and P2 to the downstream conveyor 92.

The article alignment device 10 is mainly equipped with a first conveyance device 11, a second conveyance device 12, a third conveyance device 13, a first drive unit 11a, a second drive unit 12a, and a third drive unit 13a (see FIG. 1 and FIG. 4). The article alignment device 10 is also equipped with a passage detection sensor 96 and a drop detection sensor (corresponding to a determination unit) 97 (see FIG. 1). Each of the configurations of the article alignment device 10 will be described below.

(3-1) First Conveyance Device and First Drive Unit (3-1-1) First Conveyance Device The first conveyance device 11 receives the bags P1 and P2 that have been conveyed thereto by the upstream conveyor 91 and conveys the bags P1 and P2 toward the second conveyance device 12. The first conveyance device 11 has a horizontal conveyance unit 11b and an inclined conveyance unit 11c.

(a) Horizontal Conveyance Unit

The horizontal conveyance unit 11b is placed on the upstream side of the first conveyance device 11. The horizontal conveyance unit 11b is disposed parallel with respect to a horizontal plane. The horizontal conveyance unit 11b is configured by an endless belt conveyor. Concavo-convexities are formed in the conveyance surface of the endless belt conveyor, and the conveyance surface has frictional force with respect to the bags P1 and P2. The horizontal conveyance unit 11b receives the bags P1 and P2 that have been conveyed thereto by the upstream conveyor 91 and transfers the bags P1 and P2 to the inclined conveyance unit 11c without changing the planar orientation of the bags P1 and P2. That is, the horizontal conveyance unit 11b conveys the bags P1 and P2 in the first planar orientation. A guide member 99 is attached to the horizontal conveyance unit 11b. The guide member 99 is a member that guides the bags P1 and P2 in such a way that the bags P1 and P2 advance along a predetermined course. The guide member 99 is disposed on one width direction end side of the horizontal conveyance unit 11b. The guide member 99 has a predetermined length in the vertical direction.

(b) Inclined Conveyance Unit

The inclined conveyance unit 11c is placed on the downstream side of the first conveyance device 11 and downstream of the horizontal conveyance unit 11b. The inclined conveyance unit 11c is disposed inclined with respect to the horizontal conveyance unit 11b. Specifically, the end portion on the upstream side of the inclined conveyance unit 11c is in the same horizontal position as the end portion on the downstream side of the horizontal conveyance unit 11b, and the end portion on the downstream side of the inclined conveyance unit 11c is in a lower horizontal position than the end portion on the upstream side of the inclined conveyance unit 11c with respect to a horizontal plane. The inclined conveyance unit 11c is disposed in such a way that its inclination with respect to a horizontal plane is changeable. The inclined conveyance unit 11c is also configured by an endless belt conveyor. Concavo-convexities are formed in the conveyance surface of the endless belt conveyor, and the conveyance surface has frictional force with respect to the bags P1 and P2. The inclined conveyance unit 11c conveys the bags P1 and P2 to the second conveyance device 12 without changing the planar orientation of the bags P1 and P2 that have been transferred from the horizontal conveyance unit 11b. That is, the inclined conveyance unit 11c conveys the bags P1 and P2 in the first planar orientation.

(3-1-2) First Drive Unit

The first drive unit 11a is a motor that drives the horizontal conveyance unit 11b and the inclined conveyance unit 11c. The first drive unit 11a also continuously drives the horizontal conveyance unit 11b and the inclined conveyance unit 11c on the basis of a set speed. The first drive unit 11a is controlled by the control device 95.

(3-2) Second Conveyance Device and Second Drive Unit (3-2-1) Second Conveyance Device The second conveyance device 12 receives the bags P1 and P2 that have been conveyed thereto by the first conveyance device 11 and conveys the bags P1 and P2 further downstream. Specifically, the second conveyance device 12 receives the bags P1 and P2 that have dropped from the inclined conveyance unit 11c and conveys the bags P1 and P2 toward the third conveyance device 13.

The second conveyance device 12 has a conveyance unit (a second conveyance unit) that conveys the bags P1 and P2. The second conveyance unit is also configured by an endless belt conveyor. Concavo-convexities are formed in the conveyance surface of the endless belt conveyor, and the conveyance surface has frictional force with respect to the bags P1 and P2. The second conveyance device 12 is placed under the first conveyance device 11. Specifically, the second conveyance device 12 is placed in a position that the bags P1 and P2 that have dropped from the inclined conveyance unit 11c reach. The second conveyance device 12 is disposed inclined with respect to a horizontal plane. Specifically, the end portion on the upstream side of the second conveyance device 12 is in a horizontal position lower than the end portion on the downstream side of the inclined conveyance unit 11c, and the end portion on the downstream side of the second conveyance device 12 is positioned lower than the end portion on the upstream side of the second conveyance device 12 with respect to a horizontal plane.

The second conveyance device 12 appropriately changes the planar orientation of the bags P1 and P2 that have been conveyed thereto by the inclined conveyance unit 11c and conveys the bags P1 and P2 to the third conveyance device 13. That is, the second conveyance device 12 conveys the bags P1 and P2 in either one of the first planar orientation and a second planar orientation. Here, the second planar orientation is a orientation that is different from the first planar orientation. Specifically, the second planar orientation is a orientation where the upper ends UE of the bags P1 and P2 are positioned on the downstream side and the lower ends LE of the bags P1 and P2 are positioned on the upstream side with respect to the conveyance direction of the bags P1 and P2. In other words, the second planar orientation is a orientation where the bags P1 and P2 are conveyed in a orientation where the lower ends LE face the upstream side.

(3-2-2) Second Drive Unit

The second drive unit 12a is a motor that drives the second conveyance device 12. The second drive unit 12a drives the second conveyance device 12 at a constant speed according to a set speed. The second drive unit 12a also intermittently drives the second conveyance device 12. The second drive unit 12a is controlled by the control device 95. The control device 95 controls the second drive unit 12a on the basis of position information of the bags P1 and P2 obtained by the sensors 96 and 97. This will be described in detail together in conjunction with the description of the control device 95.

(3-3) Third Conveyance Device and Third Drive Unit (3-3-1) Third Conveyance Device The third conveyance device 13 receives the bags P1 and P2 that have been conveyed thereto by the second conveyance device 12 and conveys the bags P1 and P2 further downstream. The third conveyance device 13 is disposed parallel with respect to a horizontal plane. The end portion on the upstream side of the third conveyance device 13 is placed in the same horizontal position as the lower end of the second conveyance device 12.

The third conveyance device 13 also has a conveyance unit (a third conveyance unit) that conveys the bags P1 and P2. The third conveyance unit is also configured by an endless belt conveyor. Concavo-convexities are formed in the conveyance surface of the endless belt conveyor, and the conveyance surface has frictional force with respect to the bags P1 and P2. The third conveyance device 13 conveys the bags P1 and P2, which have been conveyed thereto by the second conveyance device 12, to the downstream conveyor 92 without changing the planar orientation of the bags P1 and P2. That is, the third conveyance device 13 conveys the bags P1 and P2 in either one of the first planar orientation and the second planar orientation. Specifically, the third conveyance device 13 conveys two bags P1 and P2 with different planar orientations downstream in an orientation where the two bags P1 and P2 partially overlap each other. More specifically, the third conveyance device 13 conveys the two bags P1 and P2 to the downstream conveyor 92 in a orientation where the bag P1 and the bag P2 overlap each other and where the upper end UE of the bag P2 is in a position close to the lower end LE of the bag P1.

(3-3-2) Third Drive Unit

The third drive unit 13a is a motor that drives the third conveyance device 13. The third drive unit 13a drives the third conveyance device 13 at a constant speed according to a set speed. The third drive unit 13a also intermittently drives the third conveyance device 13. The third drive unit 13a drives the third conveyance device 13 in such a way that the two bags P1 and P2 that have been conveyed thereto by the second conveyance device 12 lie on top of each another on the belt conveyor. The third drive unit 13a is controlled by the control device 95. This will be described in detail in conjunction with the description of the control device 95.

(3-4) Passage Detection Sensor and Drop Detection Sensor

The passage detection sensor 96 determines that the bags P1 and P2 conveyed by the first conveyance device 11 have reached a first predetermined position. The first predetermined position is a position before the bags P1 and P2 drop to the second conveyance device 12. That is, the passage detection sensor 96 detects the bags P1 and P2 passing through the neighborhood of the lower end of the first conveyance device 11. In other words, the passage detection sensor 96 detects the bags P1 and P2 just before the bags P1 and P2 drop to the second conveyance device 12. The passage detection sensor 96 is, for example, placed in the neighborhood of the downstream side end portion of the horizontal conveyance unit 11b (see FIG. 1).

The drop detection sensor 97 determines that the bags P1 and P2 conveyed by the first conveyance device 11 have reached a second predetermined position. The second predetermined position is a position on the conveyance surface of the second conveyance device 12 with which the bags P1 and P2 that have dropped from the first conveyance device 11 come into contact. That is, the drop detection sensor 97 detects the bags P1 and P2 that have dropped from the inclined conveyance unit 11c. The drop detection sensor 97 is, for example, placed in the neighborhood of the conveyance surface of the second conveyance device 12 on which the bags P that have dropped from the inclined conveyance unit 11c land (see FIG. 1).

The passage detection sensor 96 and the drop detection sensor 97 are photoelectric sensors or photosensors, for example. When the passage detection sensor 96 and the drop detection sensor 97 detect the bags P1 and P2, they transmit signals indicating this to the control device 95.

(4) Downstream Conveyor

The downstream conveyor 92 receives the bags P1 and P2 that have been conveyed thereto by the third conveyance device 13 and convey the bags P1 and P2 toward the boxing device 93. The downstream conveyor 92 conveys the bags P1 and P2 to the boxing device 93 without changing the planar orientation of the bags P1 and P2 that have been conveyed thereto by the third conveyance device 13. That is, the downstream conveyor 92 conveys the bags P1 and P2 in an orientation where the bags P1 and P2 overlap each other.

The downstream conveyor 92 also has an endless belt conveyor. Concavo-convexities are formed on the conveyance surface of the endless belt conveyor, and the conveyance surface has frictional force with respect to the bags P.

The downstream conveyor 92 is driven by a downstream drive unit 92a. The downstream drive unit 92a intermittently drives the downstream conveyor 92 at a constant speed according to a set speed. The downstream drive unit 92a is controlled by the control device 95.

(5) Boxing Device

The boxing device 93 boxes the bags P1 and P2 that have been conveyed thereto by the downstream conveyor 92. Specifically, the boxing device 93 changes the posture of plural sets (e.g., 3 sets) of the stacked bags P1 and P2, slides the bags P1 and P2 inside the box B, and boxes the bags P1 and P2 (see FIG. 3).

(6) Box Conveyance Device

The box conveyance device 94 conveys downstream the box B in which the bags P1 and P2 have been packed. The box conveyance device 94 also has an endless belt conveyor. The endless belt conveyor has frictional force with respect to the box B. The box conveyance device 94 is driven at the timing when the box B on the belt conveyor has been detected by a sensor not shown in the drawings.

(7) Control Device

The control device 95 comprises a CPU, a ROM, a RAM, and a hard disk, and reads out and executes a program for controlling each part of the boxing system 100. As shown in FIG. 4, the control device 95 is connected to the upstream drive unit 91a, the downstream drive unit 92a, the first drive unit 11a, the second drive unit 12a, the third drive unit 13a, the passage detection sensor 96, the drop detection sensor 97, the drive unit of the boxing device 93, and the drive unit of the box conveyance device 94. The control device 95 controls the drive unit of each device in accordance with settings resulting from an operator and the signals from the sensors 96 and 97.

The control device 95 also switches between and executes first processing and second processing in accordance with the order in which the bags P are conveyed in order for the bags P1 and P2 to be aligned by the article alignment device 10. The first processing is processing for changing the planar orientation of the bags. The second processing is processing for maintaining the planar orientation of the bags. By switching between and executing the first processing and the second processing, the control device 95 causes the lower ends LE of the bags P1 and the upper ends UE of the bags P2 to neighbor each other. The control of the article alignment device 10 by the control device 95 and the orientations in which the bags P1 and P2 are conveyed by the control will be described in detail below.

(7-1) Control of Article Alignment Device

Figure 5:
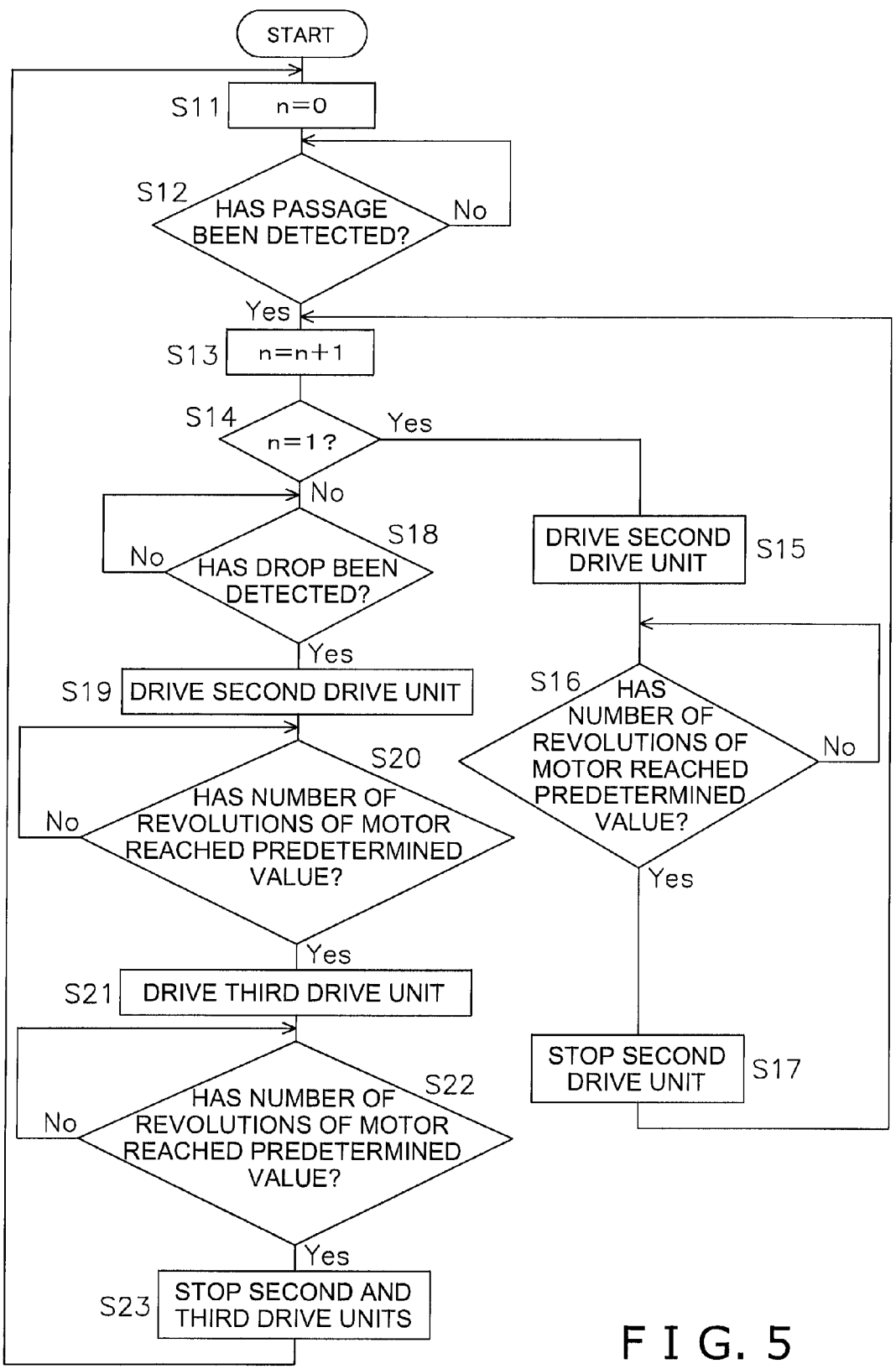
FIG. 5 is a diagram showing a flow pertaining to control of the article alignment device.

The control of the article alignment device 10 pertaining to the present embodiment will be described using FIG. 5 to FIG. 7D. FIG. 5 is a diagram showing a flow pertaining to the control of the article alignment device 10 by the control device 95. FIG. 6A to FIG. 7D are diagrams showing orientations of conveyance of the bags P1 and P2 resulting from the control of the article alignment device 10.

First, in step S11, 0 is input for n (n=0). Thereafter, in step S12, it is judged whether or not the bags P1 and P2 have been detected by the passage detection sensor 96. In step S12, the control device 95 stands by until the signal indicating that the bags P1 and P2 have been detected is input from the passage detection sensor 96. When in step S12 the signal is input from the passage detection sensor 96, the control device 95 advances to step S13.

In step S13, n+1 is input for n (n=n+1). Thereafter, in step S14, it is judged whether or not n is equal to 1. Here, it is judged whether the bag P that has been detected by the passage detection sensor 96 is the bag P1 conveyed in odd numbers or the bag P2 conveyed in even numbers. In a case where n is equal to 1 (a case where the detected bag is the bag P1 conveyed in odd numbers) in step S14, the control device 95 advances to step S15. In step S15, the control device 95 controls the second drive unit 12a. That is, the second conveyance device 12 is driven before the bag P1 drops to the second conveyance device 12 (corresponding to the second processing; see FIG. 6A). Thereafter, the control device 95 advances to step S16.

Thereafter, in step S16, it is judged whether or not the number of revolutions of the motor of the second drive unit 12a has reached a predetermined value. In other words, it is judged whether or not the bag P1 has been conveyed a predetermined distance by the second conveyance device 12. In step S16, the control device 95 stands by until the number of revolutions of the motor reaches a predetermined value. When the number of revolutions of the motor reaches the predetermined value, the control device 95 advances to step S17. In step S17, the control device 95 stops the second drive unit 12a. Thereafter, the control device 95 returns to step S13.

On the other hand, in a case where n is not equal to 1 (a case where the detected bag is the bag P2 conveyed in even numbers) in step S14, the control device 95 advances to step S18.

In step S18, it is judged whether or not the bag P2 has been detected by the drop detection sensor 97. That is, it is judged whether or not the bag P2 has dropped from the inclined conveyance unit 11c to the second conveyance device 12. In step S18, the control device 95 stands by until the signal indicating that the bag P2 has been detected is input from the drop detection sensor 97. When in step S18 the signal from the drop detection sensor 97 is input, the control device 95 advances to step S19.

In step S19, the control device 95 controls the second drive unit 12a. That is, in step S19, the second conveyance device 12 is driven after the bag P2 has dropped to the second conveyance device 12 (corresponding to the first processing; see FIG. 7B). Thereafter, the control device 95 advances to step S20.

In step S20, it is judged whether or not the number of revolutions of the motor of the second drive unit 12a has reached a predetermined value. In other words, it is judged whether or not the bag P2 has been conveyed a predetermined distance by the second conveyance device 12. In step S20, the control device 95 stands by until the number of revolutions of the motor reaches the predetermined value. When the number of revolutions of the motor reaches the predetermined value, the control device 95 advances to step S21.

In step S21, the control device 95 controls the third drive unit 13a.That is, the bags P1 and P2 are conveyed a predetermined distance by the third conveyance device 13. Thereafter, the control device 95 advances to step S22 where it is judged whether or not the number of revolutions of the motor of the third drive unit 13a has reached a predetermined value. In step S22, the control device 95 stands by until the number of revolutions of the motor reaches the predetermined value. When the number of revolutions of the motor reaches the predetermined value, the control device 95 advances to step S23.

In step S23, the control device 95 stops the second drive unit 12a and the third drive unit 13a.Thereafter, the control device 95 returns to step S11.

(7-2) Conveyance of Bags
(7-2-1) Conveyance of Odd-Numbered Bags

Figure 6A:
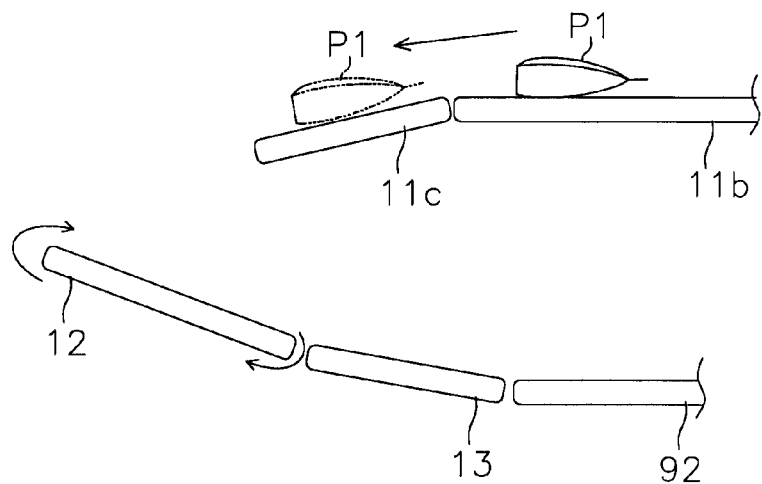
FIG. 6A is a diagram showing the control of the article alignment device and conveyance of the bags during execution of second processing.

As shown in FIG. 6A, the bag P1 that has been conveyed in the first planar orientation by the horizontal conveyance unit 11b is transferred to the inclined conveyance unit 11c.When the bag P1 is transferred to the inclined conveyance unit 11c, the bag P1 is detected by the passage detection sensor 96. Then, the second drive unit 12a is controlled by the control device 95 and the second conveyance device 12 is driven (the second processing). At this time, the third conveyance device 13 is not driven.

Figure 6B:
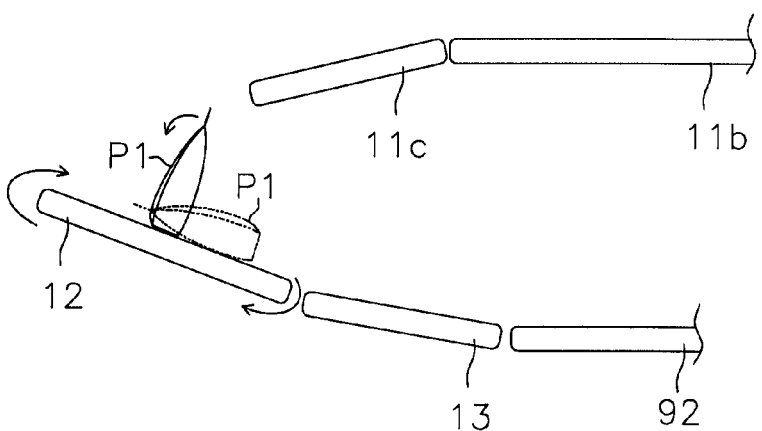
FIG. 6B is a diagram showing the control of the article alignment device and conveyance of the bags during execution of the second processing.
Figure 6C:
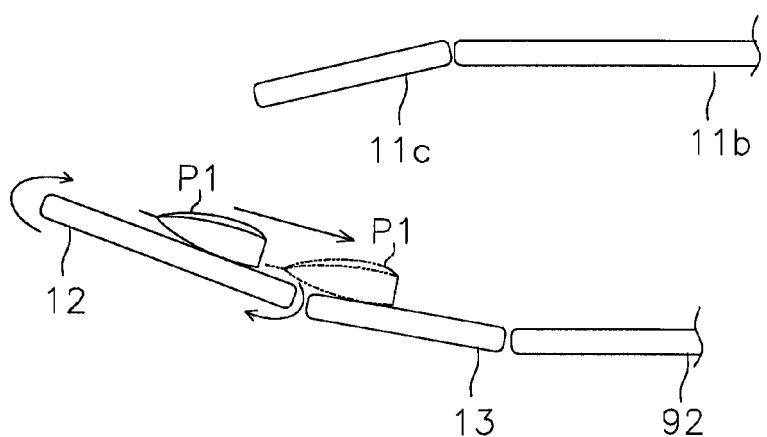
FIG. 6C is a diagram showing the control of the article alignment device and conveyance of the bags during execution of the second processing.

As shown in FIG. 6B, the bag P1 thereafter drops from the inclined conveyance unit 11c to the second conveyance device 12 that is being driven. At this time, the bag P1 falls over in such a way that the upper end UE of the bag P1 is on the upstream side. That is, the bag P1 falls over in such a way that the upper end UE is positioned on the upstream side and the lower end LE is positioned on the downstream side. Because of this, the bag P1 is conveyed in the first planar orientation by the second conveyance device 12. When the number of revolutions of the motor of the second drive unit 12a reaches the predetermined value, the bag P1 is transferred to the third conveyance device 13 as shown in FIG. 6C.

(7-2-2) Conveyance of Even-Numbered Bags

Figure 7A:
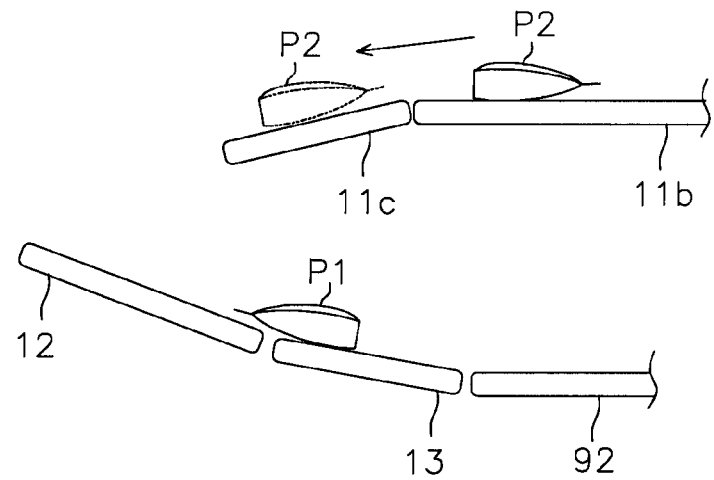
FIG. 7A is a diagram showing the control of the article alignment device and conveyance of the bags during execution of first processing.

As shown in FIG. 7A, the bag P2 is conveyed following the bag P1. The bag P2 is also conveyed in the first planar orientation by the horizontal conveyance unit 11b. Thereafter, the bag P2 is transferred to the inclined conveyance unit 11c.At this time, the second conveyance device 12 and the third conveyance device 13 are stopped.

Figure 7B:
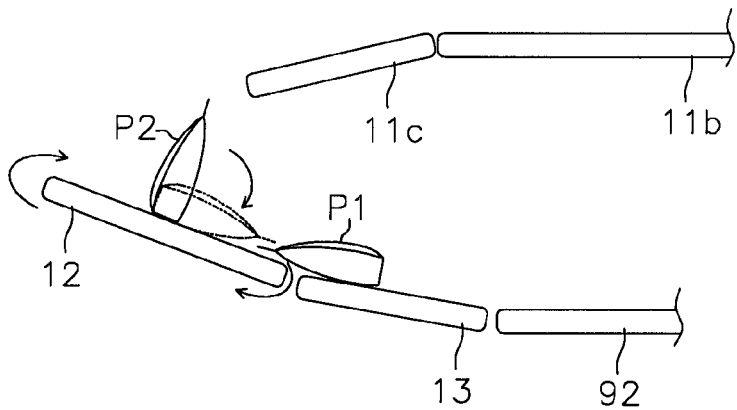
FIG. 7B is a diagram showing the control of the article alignment device and conveyance of the bags during execution of the first processing.
Figure 7C:
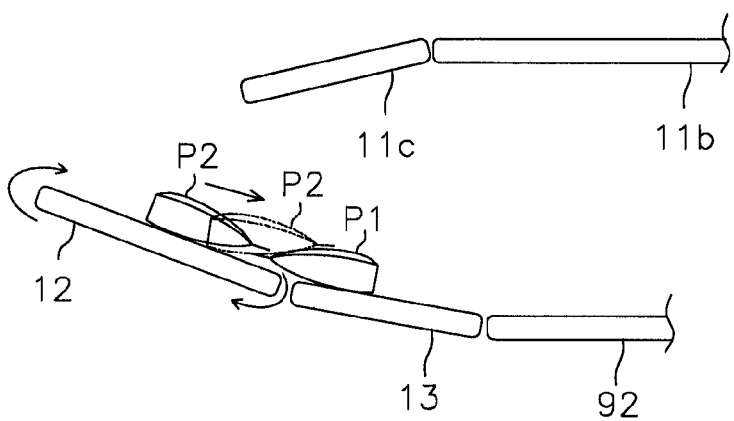
FIG. 7C is a diagram showing the control of the article alignment device and conveyance of the bags during execution of the first processing.

Thereafter, the bag P2 drops from the inclined conveyance unit 11c to the second conveyance device 12 that is stopped. When the drop of the bag P2 is detected by the drop detection sensor 97, the second drive unit 12a is controlled (the first processing). That is, the second drive unit 12a drives the second conveyance device 12 after the bag P2 has dropped to the belt conveyor of the second conveyance device 12. At this time, the bag P2 falls over in such a way that the upper end UE is on the downstream side as shown in FIG. 7B. That is, the bag P2 falls over in such a way that the upper end UE is positioned on the downstream side and the lower end LE is positioned on the upstream side. Because of this, the bag P2 is conveyed in the second planar orientation by the second conveyance device 12. When the number of revolutions of the motor of the second drive unit 12a reaches the predetermined value, the bag P2 is transferred to the third conveyance device 13. Here, when the bag P2 is transferred to the third conveyance device 13, as shown in FIG. 7C, the bag P2 is conveyed in such a way as to lie on top of the bag P1.

Thereafter, the third drive unit 13a is controlled by the control device 95 and the third conveyance device 13 is driven by the third drive unit 13a.Because of this, as shown in FIG. 7D, the two bags P1 and P2 lying on top of each other are conveyed downstream.

(8) Characteristics
(8-1)

The article alignment device 10 pertaining to the above-described embodiment is used in the boxing system 100 for efficiently boxing the articles (bags) where the shapes of the upper ends and the lower ends differ from each other. The bags where the shapes of the upper ends and the lower ends differ from each other are bags having bottom portions such as standing pouches, for example. In other words, the bags where the shapes of the upper ends and the lower ends differ from each other are bags where the thickness of the upper ends and the thickness of the lower ends differ from each other. When such bags are conveyed in a constant planar orientation, it is difficult to efficiently box these bags in the box B at the time of boxing. That is, when the bags are conveyed in a constant planar orientation, eventually the bags are boxed in such a way that the sections of the bags where the thickness is large are adjacent to each other and the sections of the bags where the thickness is small are adjacent to each other. In this case, gaps are formed between the sections of the bags where the thickness is small. As a result, many gaps are formed inside the box B. Consequently, the space in the box B cannot be efficiently used to pack the bags in the box B.

However, the article alignment device 10 pertaining to the above-described embodiment appropriately changes the planar orientation of the bags in such a way that the planar orientation of the first bag P1 and the planar orientation of the second bag P2 that is conveyed following the first bag P1 become different orientations. Because of this, eventually the bags become packed in the box in such a way that the sections of the bags where the thickness is large and the sections of the bags where the thickness is small are adjacent to each other. Because of this, the bulk of the first bag P1 and the second bag P2 can be reduced, and the number of bags that can be packed in the box 13 can be increased.

(8-2)

In the above-described embodiment, the first processing and the second processing are executed by the control device 95 in such a way that the lower end LE of the first bag P1 and the upper end UE of the second bag P2 neighbor each other. Because of this, a large number of the articles can be effectively aligned.

(9) Modifications
(9-1) Modification A

In the above-described embodiment, the first conveyance device 11 comprises the horizontal conveyance unit 11b and the inclined conveyance unit 11c.Here, the horizontal conveyance unit 11b and the inclined conveyance unit 11c may also be integrally formed. Further, the horizontal conveyance unit 11b and the inclined conveyance unit 11c may also be driven by independent drive units.

(9-2) Modification B

In the above-described embodiment, the passage detection sensor 96 and the drop detection sensor 97 are photoelectric sensors or photosensors, but the passage detection sensor 96 and the drop detection sensor 97 may also be other sensors as long as they have configurations that can detect the bags P1 and P2.

(9-3) Modification C

In the above-described embodiment, the passage detection sensor 96 is placed in the neighborhood of the downstream side end portion of the horizontal conveyance unit 11*b*, and the drop detection sensor 97 is placed in the neighborhood of the belt conveyor of the second conveyance device 12. Here, the locations where the passage detection sensor 96 and the drop detection sensor 97 are placed may also be other locations. That is, the passage detection sensor 96 is disposed in a location where it can detect that the bag P1 is in a position before the bag P1 drops from the inclined conveyance unit 11*c*, and the drop detection sensor 97 is disposed in a location where it can detect that the bag P2 has dropped.

(9-4) Modification D

In the above-described embodiment, the control device 95 switches between and executes the first processing and the second processing on the basis of the order of the bags being conveyed and the signals obtained from the passage detection sensor 96 and the drop detection sensor 97. Here, as for the timing when the control device 95 switches between the first processing and the second processing, the control device 95 may also switch between the first processing and the second processing on the basis of the order of the bags being conveyed and the number of revolutions of the motors. That is, the control device 95 may also determine the moving distances of the bags as a result of the numbers of revolutions of the motors of the first drive unit 11*a* and the second drive unit 12*a* reaching the predetermined values and switch between the first processing and the second processing in accordance with the moving distances of the bags.

(9-5) Modification E

In the above-described embodiment, the control device 95 uses both the passage detection sensor 96 and the drop detection sensor 97 to acquire the position information of the bags P1 and P2 and drive the second conveyance device 12, but the control device 95 may also determine the drop of the bags P1 and P2 without using the drop detection sensor 97. For example, the control device 95 may determine the drive timing of the second conveyance device 12 on the basis of the passage detection sensor 96 and the number of revolutions of the motor of the first drive unit 11*a*.

(9-6) Modification F

In the above-described embodiment the control device 95 changes the planar orientation of the bag P2 conveyed by the second conveyance device 12 by controlling the drive timing of the second conveyance device 12. Here, the control device 95 may also employ an actuator including air blowing unit in order to change the planar orientation of the bag P2 conveyed by the second conveyance device 12. In this case, the second conveyance device 12 is continuously driven. The actuator changes the planar orientation of the bag P2 from the first planar orientation to the second planar orientation by blowing air onto the bag P2 conveyed from the first conveyance device 11 to the second conveyance device 12. More specifically, the actuator changes the planar orientation of the bag P2 from the first planar orientation to the second planar orientation by blowing air onto the bag P2 after the bag P2 has separated from the first conveyance device 11 and before the bag P2 drops to the second conveyance device 12. The control device 95 executes the second processing when the odd-numbered bag P1 has been conveyed and executes the first processing when the even-numbered bag P2 has been conveyed. Here, the second processing is processing that maintains the planar orientation of the bag P1 in the first planar orientation without driving the actuator. The first processing is processing that drives the actuator to change the planar orientation of the bag P2 from the first planar orientation to the second planar orientation. That is, the control device 95 selectively executes the first processing and the second processing in such a way that the sections of the bag P1 and the bag P2 where the thickness is small overlap each other. Because of this also, the bulk of the first bag P1 and the second bag P2 can be reduced, and the number of bags that can be packed in the box B can be increased.

The control device 95 preferably includes a microcomputer with a packing control program that controls the article alignment device, as discussed below. The control device 95 can also include other conventional components such as an input interface circuit, an output interface circuit, and storage devices such as a ROM (Read Only Memory) device and a RAM (Random Access Memory) device. The microcomputer of the control device 95 is programmed to control the article alignment device in a manner consistent with the above description. The memory circuit stores processing results and control programs such as ones for conveying operations that are run by the processor circuit. The control device 95 is operatively coupled to the article alignment device in a conventional manner. The internal RAM of the control device 95 stores statuses of operational flags and various control data. The internal ROM of the control device 95 stores the operational instructions for the various operations. The control device 95 is capable of selectively controlling any of the components of the article alignment device in accordance with the control program. It will be apparent to those skilled in the art from this disclosure that the precise structure and algorithms for the control device 95 can be any combination of hardware and software that will carry out the functions of the present invention.

What is claimed is:

1. An article alignment device for aligning a plurality of articles, the article alignment device comprising:

a first conveyance device that carries and conveys the articles in a first conveyance direction, each of the plurality of articles having a first end portion and a second end portion opposed to the first end portion, the first end portion having a first shape and the second end portion having a second shape different than the first shape, the first conveyance device conveying each of the plurality of articles in a first orientation where the first end portions face downstream with respect to the first conveyance direction;

a second conveyance device located downstream of the first conveyance device and further conveys the plurality of articles that have been conveyed thereto by the first conveyance device; and a control device configured to control operation of the first conveyance device and the second conveyance device such that a selected first article of the plurality articles is switched from the first orientation to a second orientation where the second end portion of the first article faces downstream with respect to the first conveyance direction, and a second article of the plurality of articles adjacent to the first article is maintained in the first orientation.

2. The article alignment device according to claim 1, wherein the control device is configured such that the first and second conveyance devices position the second end portion of the first article and the second end portion of the second article neighboring each other.

3. The article alignment device according to claim 1, wherein the thickness of the second end portions is smaller than the thickness of the first end portions.

4. The article alignment device according to any of claims 1, further comprising a first drive unit that drives the first conveyance device, a second drive unit that drives the second conveyance device, and a determination unit that determines that the articles conveyed by the first conveyance device have reached a predetermined position, wherein the control device controls the first drive unit and the second drive unit in response to the determination by the determination unit.

5. The article alignment device according to claim 4, wherein the control device generates a drive command that drives the second drive unit before the articles reach the second conveyance device, and the control device generates the drive command after it has been determined by the determination unit that the articles have reached the second conveyance device.

6. The article alignment device according to claim 1, wherein the control device is configured to control the second conveyance device to intermittently switch the first article of the plurality articles from the first orientation to the second orientation.

7. The article alignment device according to claim 1, wherein the second conveyance device is inclined with respect to horizontal and the first conveyance device is inclined relative to the second conveyance device.

* * * * *